US008068594B2

(12) United States Patent
Mergen et al.

(10) Patent No.: US 8,068,594 B2
(45) Date of Patent: Nov. 29, 2011

(54) COMMUNICATION CENTER METHODS AND APPARATUS

(75) Inventors: John-Francis Mergen, Baltimore, MD (US); Daniel Martin Wood, Acton, MA (US)

(73) Assignee: Federal Network Systems LLC, Ashburn, VA (US)

( * ) Notice: Subject to any disclaimer, the term of this patent is extended or adjusted under 35 U.S.C. 154(b) by 1120 days.

(21) Appl. No.: 11/692,529

(22) Filed: Mar. 28, 2007

(65) Prior Publication Data

US 2008/0240401 A1 Oct. 2, 2008

(51) Int. Cl.
*H04M 3/00* (2006.01)
(52) U.S. Cl. ......... 379/265.01; 379/265.09; 379/265.11; 379/265.13; 379/266.01; 379/266.02
(58) Field of Classification Search ............. 379/266.01, 379/356.01, 21.01, 211.02, 88.21; 455/417; 707/10; 705/9, 29
See application file for complete search history.

(56) References Cited

U.S. PATENT DOCUMENTS

| 7,764,955 | B1 * | 7/2010 | Mangal et al. ............... 455/417 |
| 7,809,001 | B2 * | 10/2010 | Yamakawa ................. 370/395.1 |
| 2002/0146112 | A1 * | 10/2002 | Larson et al. ............. 379/356.01 |
| 2002/0194047 | A1 * | 12/2002 | Edinger et al. .................... 705/9 |
| 2003/0139975 | A1 * | 7/2003 | Perkowski ....................... 705/26 |
| 2003/0194075 | A1 * | 10/2003 | McGrath et al. .......... 379/218.01 |
| 2005/0240594 | A1 * | 10/2005 | McCormack et al. .......... 707/10 |
| 2006/0177035 | A1 * | 8/2006 | Cope et al. ............... 379/211.02 |
| 2006/0193462 | A1 * | 8/2006 | Hansen .................... 379/266.01 |
| 2007/0206736 | A1 * | 9/2007 | Sprigg et al. ............... 379/88.21 |

* cited by examiner

*Primary Examiner* — Curtis Kuntz
*Assistant Examiner* — Joseph J Nguyen

(57) ABSTRACT

A communications center supports sales and/or customer support services corresponding to a plurality of business affiliations. Operator terminals within the communications center are configurable. A management module manages the allocation of the operator terminals between the plurality of different business affiliations being supported by the communications center. The management module loads a set of configuration information into an operator terminal to match a determined business affiliation with a customer's communications device capabilities. At different times, e.g. corresponding to an initial communications session and a follow-on communications session, the same customer may be connected to different physical operator terminals and be communicating with different actual operators; however, from the perspective of the customer, the customer is made to think that the communication is with the same operator terminal and same operator.

23 Claims, 11 Drawing Sheets

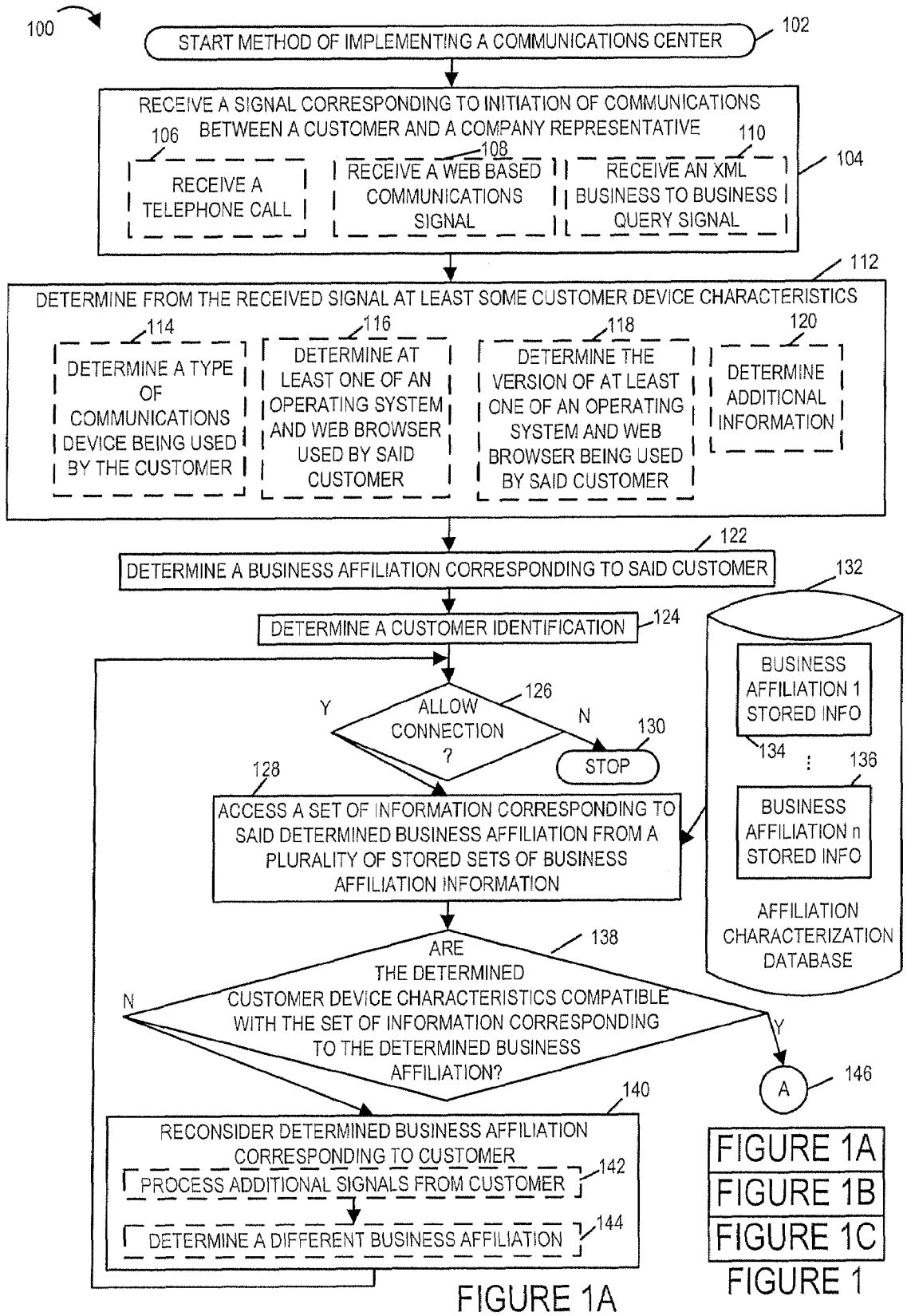

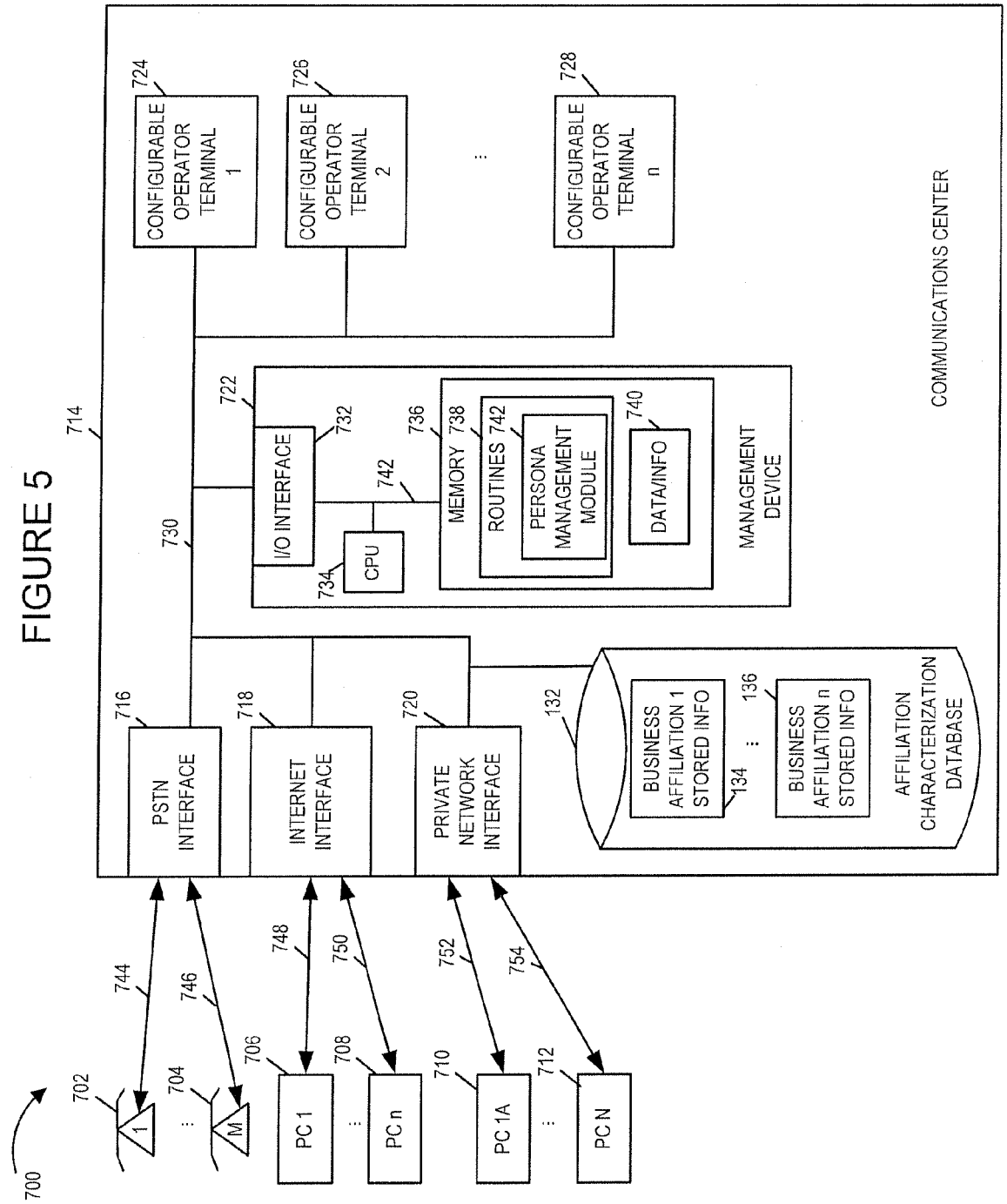

US 8,068,594 B2

COMMUNICATION CENTER METHODS AND APPARATUS

BACKGROUND

Communications centers are utilized for sales and a wide range of customer service activities. Many different corporations have a need to use such communications centers. However, many of these corporations do not have a demand sufficient to justify a communications center dedicated solely to the individual corporation and/or may have a need to use such a facility on a part time basis, e.g., during certain hours of the day. For such a company it can be costly both in terms of infrastructure and personnel to maintain its own dedicated communications center. Such companies typically look to outsource such activities.

There is a need for methods and apparatus which allow a communications center, e.g., a call center, to interact with customers using a wide range of communications devices and/or to represent multiple different corporations with the customers of each corporation receiving appropriate service and/or interaction which looks, from the customers perspective, as service which is being provided by the particular company they seek to interact with. It is important that the customer interaction be consistent and match a user's expectations each time the customer seeks to contact the particular company. This may require a fair amount of device configuration to satisfy the customization needs of each individual company and/or the device requirements of the various customers. Methods and apparatus that allow communications center resources to be allocated among a plurality of different business affiliations on an as needed basis, while giving a consistent appearance and experience to customers would be beneficial. In fact, it would be desirable, if repeat contacts, e.g., calls, could be handled in a manner that appears to the customer as if he or she is interacting with the same customer service representative even if the communication, e.g., call, is in fact being handled by a different customer service representative and/or operator terminal.

One problem typically encountered by customers who interact with a support communications center is the need to provide detailed sets of information each time the customer starts a communications session or interacts with a new operator. Such information may be used to control operator terminal configuration and/or to retrieve customer data. It would be beneficial if methods and apparatus were developed which improved the customer experience by reducing the amount of redundant customer input and/or by giving the customer the impression that a follow-on session is proceeding smoothly with the same operator. In addition to improving the customer experience, the reduced time to restore the knowledge "state" of the system would translate directly into reduced costs and improve capital utilization.

In view of the above the above discussion, it should be appreciated that there is a need for improving the way communications centers, e.g., call centers, configure communications devices, access customer information and/or access information used to present one or more customer representative personas to a customer, as part of a customer interaction such as a telephone call or Internet interaction.

BRIEF DESCRIPTION OF THE FIGURES

FIG. 5 is a drawing of an exemplary communication system.

DETAILED DESCRIPTION

Figure 1B:
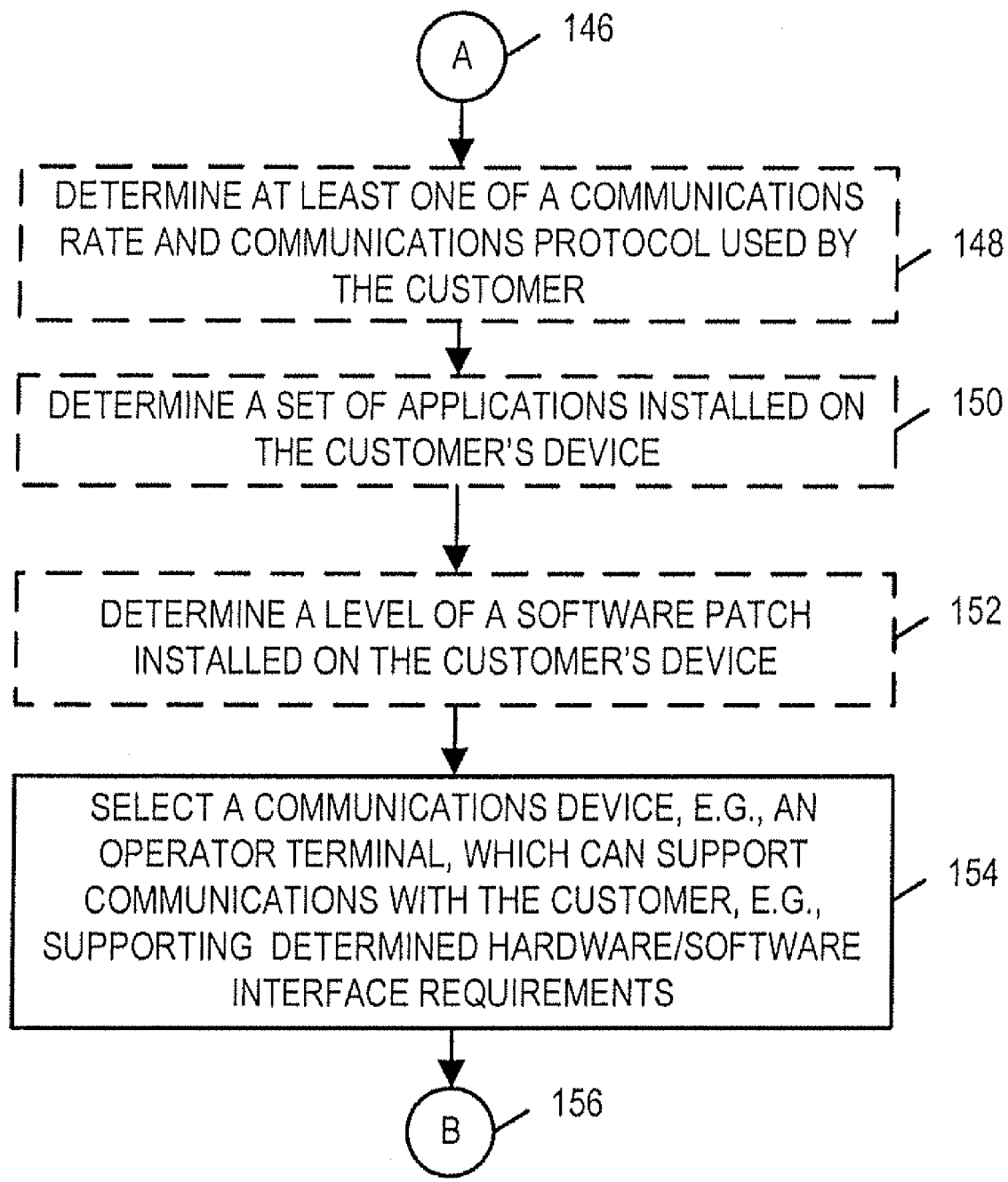
FIG. 1 comprising the combination of FIG. 1A, FIG. 1B
FIG. 1C is a flowchart of an exemplary method of implementing a communications center.
Figure 1C:
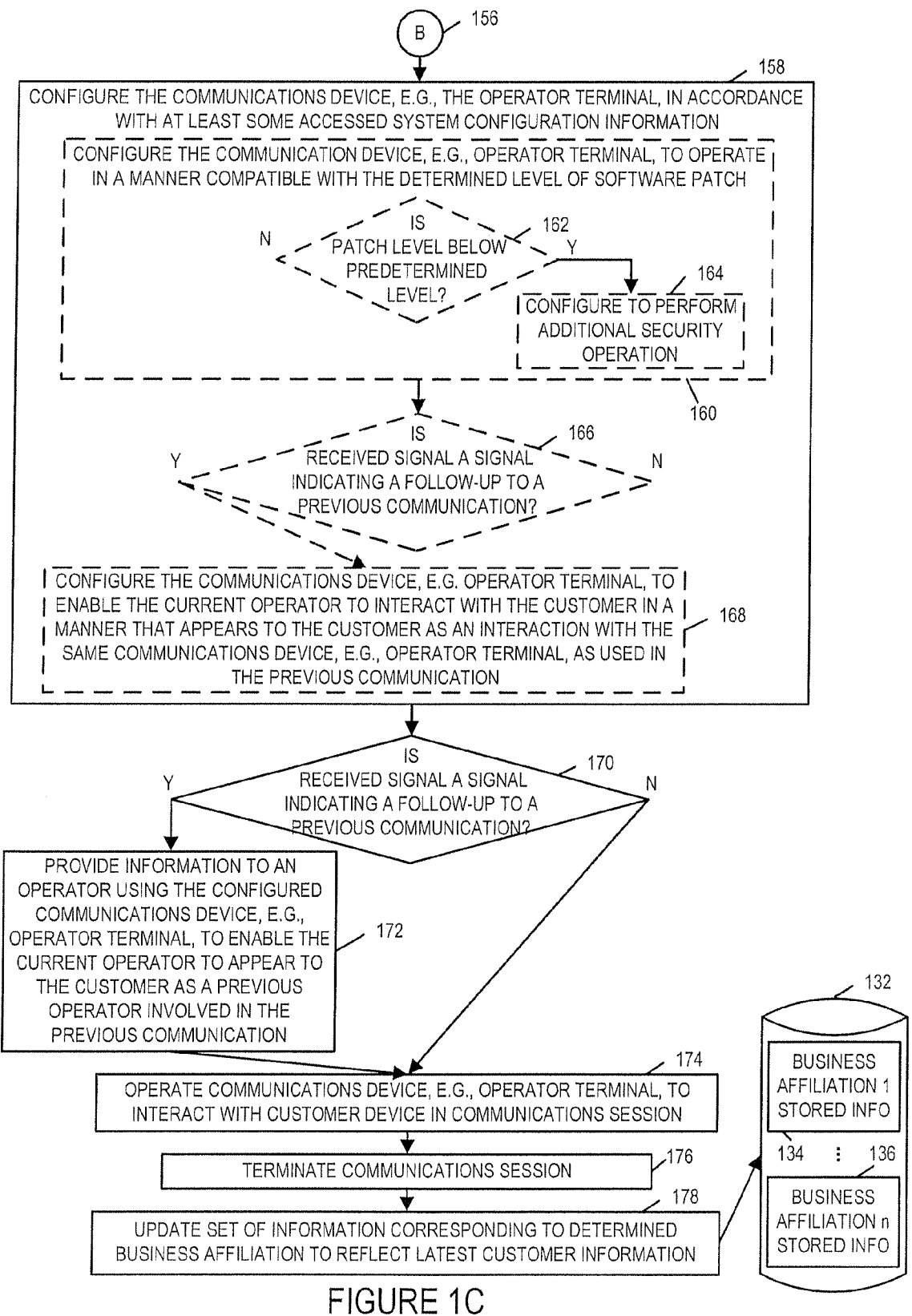

FIG. 1 is a flowchart 100 of an exemplary method of implementing a communications center in accordance with various embodiments. In the exemplary communications center at least some of the communications devices, e.g., operator terminals can be, and sometimes are, configured at different times to take on different personas. The exemplary method starts in step 102, where the center can be activated and proceeds to step 104. In step 104, the communications center receives a signal corresponding to initiation of communications between a customer and a company representative. In some embodiments, in step 104, the communications center performs one of sub-step 106, sub-step 108 and sub-step 110. In sub-step 106, the communications center receives a telephone call. In sub-step 108, the communications center receives a web based communications signal. In sub-step 110, the communications center receives an XML business to business query signal. In some embodiments, the company representative can be one of telephone operator and a customer service representative.

Operation proceeds from step 104 to step 112, in which the communications center determines from the received signal at least some customer service device characteristics. Step 112 includes, in some embodiments, one or more of sub-steps 114, 116, 118 and 120. In sub-step 114, the communications center determines a type of communications device being used by the customer. In sub-step 116, the communications center determines at least one of an operating system and Web browser being used by the customer. In sub-step 118, the communications center determines the version of at least one of an operating system and Web browser being used by the customer. In sub-step 120, the communications center determines additional information, e.g., application information, protocol information, rate information, etc., corresponding to the customer device.

Operation proceeds from step 112 to step 122, in which the communications center determines a business affiliation corresponding to said customer. This information is exogenous to any information that could be stored on the customer's computer and can be updated and modified when the customer's computer is off-line or changes computer environments. In some embodiments, different business affiliations are associated with different base phone numbers, extensions, web sites, locations on a Web page, buttons, links, web address, sub-address, connections, and/or servers. Different business affiliations, for at least some business affiliations, correspond to different firms, corporations, companies, subsidiaries, sub-divisions, and/or institutions. Different business affiliations, for at least some business affiliations, correspond to different types of businesses, e.g., phone based sales, customer service center for devices, warranty processing, customer service center for medical insurance processing, telephone and/or Web based marketing center, rebate processing center, credit card related services, financial services such as banking and/or stock related services, commercial information access, government agency information access, etc. Different business affiliations, for at least some business affiliations, correspond to different services provided by the same entity, e.g., consumer troubleshooting support, professional technician support, sales support and processing, shipping support. Different business affiliations, for at least some business affiliations, correspond to different levels of services, e.g., premier customer service, gold customer service, and silver customer service. Different business affiliations, for at least some business affiliations, correspond to different times of availability, e.g., round-the-clock access, Monday-Friday time zone 1 business hours, Monday-Friday time zone 2 business hours, etc. Different business affiliations, for at least some business affiliations, correspond to different cost models used by the same entity, e.g., free access, purchased plan access, access charge by time unit.

Operation proceeds from step 122 to step 124. In step 124, the communications center determines a customer identification. In some embodiments, the customer identification can be determined via one or more of: telecommunications service provider caller identification of source of customer signal, processing login information, processing password information, processing a transaction identifier. In some embodiments, the customer identification can be determined via one or more of: performing a voice pattern recognition operation, recovering customer device identification information, recovering embedded identification information from a customer signal, the embedded information having been automatically embedded by the customer's communications device without customer intervention. In some embodiments, the customer identification can be determined based on a match of a session identifier value communicated in the received signal to a previous session identifier corresponding to a previous session via the communications center. In various embodiments, a new customer can be assigned an identifier by the communications center, said assigned identifier to be used in a future connection interaction to identify the customer and facilitate compatible operator terminal configuration at the communications center.

Operation proceeds from step 124 to step 126. In step 126 the communications center decides if the connection can be to be allowed. The connection may not be allowed for any of a number of reasons, e.g., customer fails to pass a security access test, customer has been flagged as not to be responded to at present, determined business affiliation has limited access hours and connection attempt is outside the allowable time range, business affiliation has contractual connection throughput levels for using the communications center and an additional connections at the current time would exceed the contractual limit, determined communications device characteristics were determined to be incompatible with any potential determined business affiliations corresponding to the customer. These checks typically are not possible using a network protocol or content based firewall system. If it is determined in step 126 that the connection is allowed then operation proceeds from step 126 to step 128; otherwise, operation proceeds to step 130, where the connection is not allowed and operation with regard to this communications initiation stops.

In step 128, the communications center access a set of information corresponding to the determined business affiliation from a plurality of stored sets of business affiliation information, e.g., affiliation characterization database 132. Affiliation characterization database 132 can include business affiliation 1 stored information 134, . . . , business affiliation n stored information 136. In some embodiments, the set of accessed information corresponding to a business affiliation can include at least one of: information on the nature of the communications interaction, connection type preference, call status, and previously negotiated interaction rules. This database can continue to be populated without forcing the cooperation of the customer machine through the use of tagging mechanisms e.g. cookies.

Operation proceeds from step 128 to step 138. In step 138, the communications center determines whether the determined customer device characteristics from step 112 are compatible with the determined business affiliation of step 122. If it is determined in step 138, that the determined customer device characteristics are compatible with the determined business affiliation then, operation proceeds via connection node A 146 to step 148; otherwise, operation proceeds to step 140.

In step 140, the communications center reconsiders the determined business affiliation corresponding to the customer. In some embodiments, for at least some customers, step 140 can include one or more of sub-steps 142 and 144. In sub-step 142, the communications center processes additional signals from the customer, and in sub-step 144, the communications center determines a different business affiliation. Operation proceeds from step 140 to step 126 for further consideration as to whether a connection is now to be allowed.

Returning to step 148, in step 148, the communications center determines at least one of a communications rate, system services and a communications protocol (or protocol set) used by the customer. Operation proceeds from step 148 to step 150, in which the communications center determines a set of applications installed on the customer's device, and in step 152, the communications center determines a level of a software patch installed on the customer's device. Operation proceeds from step 152 to step 154. Steps 148, 150 and 152, in this embodiment, are optional steps.

In step 154, the communications center selects a communications device, e.g., an operator terminal, which can support communications with the customer. The selection can be, e.g., based on consideration of determined hardware and/or software interface requirements corresponding to the customer device and determined business affiliation. In some embodiments, corresponding to phone based interactions the operator terminal can be selected from a first set of operator terminals and corresponding to Web based interactions the operator terminal can be selected from a second set of terminals. Some operator terminals support higher levels of security, e.g., encryption, than other operator terminals. Some operator terminals support different image display resolution than other operator terminals. Operation proceeds from step 154 via connecting node B 156 to step 158.

Figure 3:
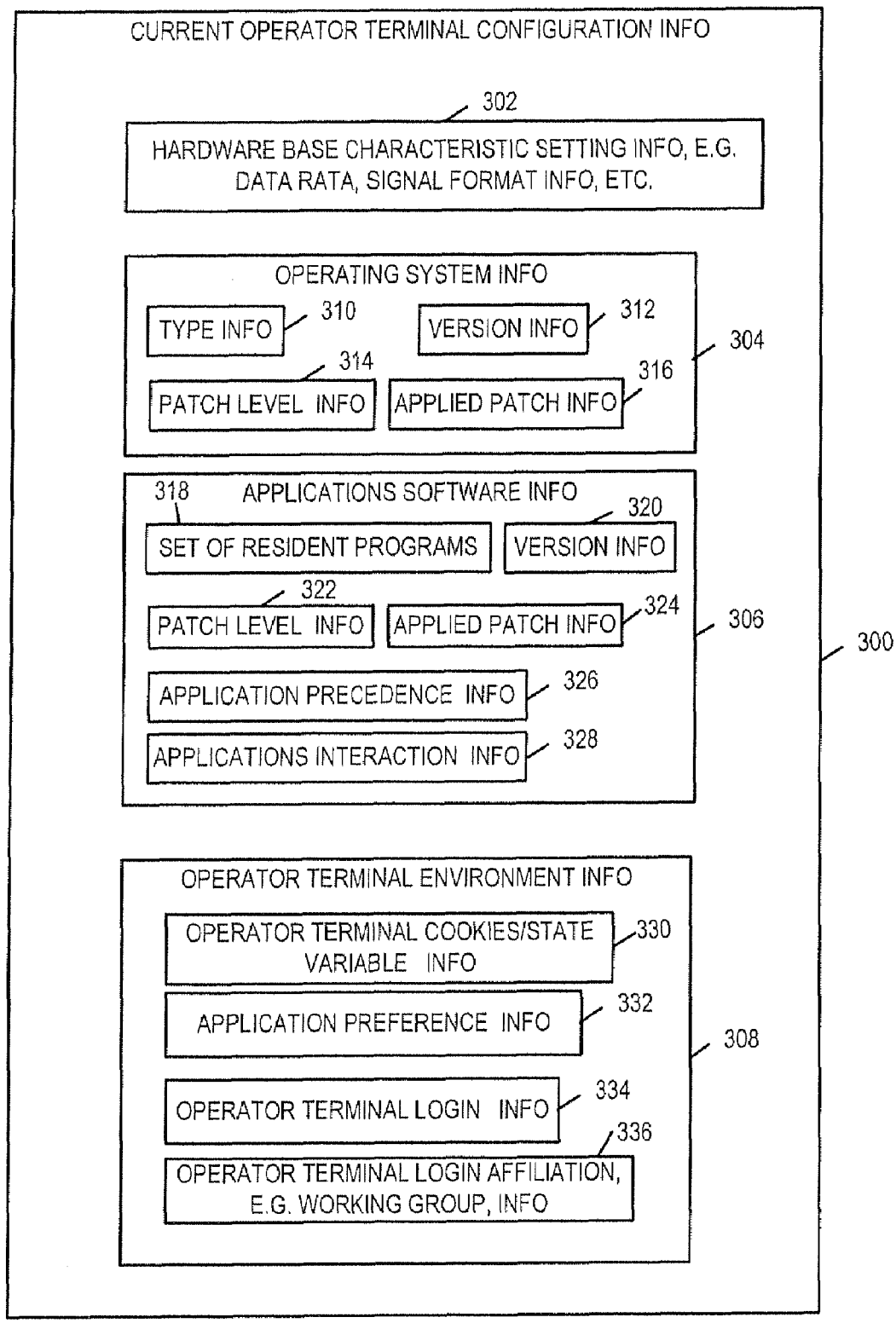
FIG. 3 illustrates exemplary operator terminal configuration information.

In step 158, the communications center configures the communications device, e.g., the operator terminal selected in step 156, in accordance with at least some accessed system configuration information. Thus step 158, configures a communications device, e.g., operator terminal, to support harmonious operation with the customer communications device associated with a determined business affiliation, e.g., matched data rate, matched protocol, matched applications, matched operating system, matched software version, etc. As part of step 158, the communications center generates a set of operator terminal configuration information which can be loaded into the selected terminal. Current operator terminal configuration information 300 of FIG. 3 is an exemplary set of such information.

Step 158 can include, in some embodiments, one or more of sub-steps 160, 166, and 168. In sub-step 160, the communications center configures the communications device, e.g., the selected operator terminal, to operate in a manner compatible with the determined level of software patch. Sub-step 160 can include sub-step 162 and sub-step 164. In sub-step 162, the communications center determines if the patch level corresponding to the customer is below a predetermined level. If it is determined in sub-step 162, that the patch level is below a predetermined level then operation proceeds to sub-step 164, where the communications device, e.g., operator terminal, can be configured to perform an additional security operation. Thus sub-step 164, provides additional measures to compensate for potential defects in the software currently resident on the customer's communication device.

Operation proceeds from sub-step 160 to sub-step 166. In sub-step 166, the communications center determines if the received signal, e.g., of step 104, can be a signal indicating a follow-up to a previous communication. If it is determined that the signal is a follow-up to a previous communications, then, operation proceeds to sub-step 168, where the communications center configures the operator terminal to enable the current operator to interact with the customer in a manner that appears to the customer as an interaction with the same operator terminal used in the previous communication. For example, the previous communications may have used some specialized application software, and that software can now be downloaded into the selected operator terminal. In Web based communications, sub-step 168 can include, in some embodiments, configuring the operator display to match the operator display last used in the previous communication which is being followed up. In some embodiments, step 168 can include configuring the operator terminal to perform operator voice signal pattern translation such that the voice signals generated by the current operator are converted to a synthetic voice pattern matching the synthetic voice pattern previously used in the communications session which is being followed up. Similarly, dialect, language and locality queues can be provided to localize speech patterns.

Operation proceeds from step 158 to step 170. In step 170, the communications center determines if the received signal, e.g., of step 104, is a signal indicating a follow-up to a previous communication. In some embodiments, in which optional step 166 is performed a flag is set as a result of the determination of step 166 and used in step 170, to direct operational flow. If it is determined in step 170, that the received signal, e.g., of step 104, is a signal indicating a follow-up to a previous communication, then operation proceeds from step 170 to step 172; otherwise, operation proceeds from step 170 to step 174.

In step 172, the communications center provides information to an operator using the configured operator terminal to enable the current operator to appear to the customer as a previous operator involved in the previous communication. In some embodiments, the provided information can include information about a customer representative identifier used in the previous communications, e.g., an alias name that can be assumed by both the previous operator and the current operator and/or an alias customer support representative number that can be assumed by both the previous operator and the current operator. In some embodiments, the provided information can include information exchanged between the customer representative and the customer during a previous communication. Thus the operator and customer can pick up the communications where left off without having to go through a lengthy, and sometimes annoying, introduction exchange. For example, a customer's medical bill, financial statement, etc., being discussed can be displayed along with customer identification information and notations corresponding to the previous communication and any pending action items. Systems software can be reset to the same operating state as when the conversation had previously left it so that the operator does not need to restart a computer based procedure e.g. trouble shooting tools would reload logs, reset diagnostic systems and load test parameters based on the earlier state.

Operation proceeds from step 172 to step 174. In step 174, the communications center operates communications device, e.g., the operator terminal, to interact with the customer device in a communication session. Then, in step 176, the communications center terminates the communications session. Operation proceeds from step 176 to step 178. In step 178, the communications center updates the set of information corresponding to the determined business affiliation to reflect latest customer information. For example, as part of the communications session some specialized application software may have been downloaded in the customer terminal, or a software version may have been updated, or the operator terminal may have recognized that that customer device has new capabilities, and information reflecting such knowledge can be updated in the business affiliation stored information to reflect the new information. Alternatively, or in addition, the communications session may have left one or more issues unresolved, and a follow-on is anticipated, and information can be stored such to as make the follow-on communications session set-up rapid and/or appear seamless from the perspective of the customer.

Figure 2:
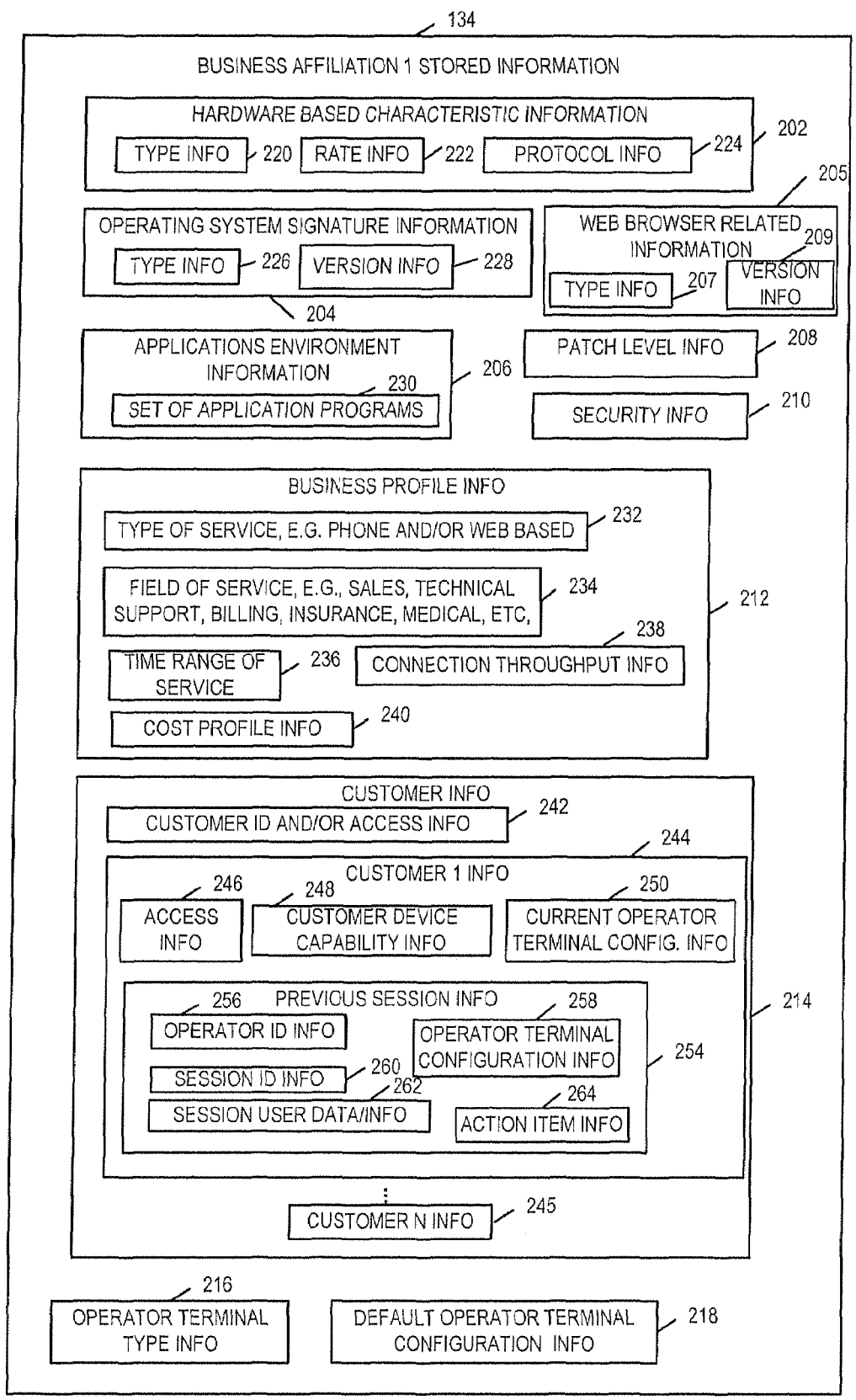
FIG. 2 illustrates an exemplary set of business affiliation stored information.

FIG. 2 is a drawing of exemplary business affiliation 1 stored information 134. Business affiliation 1 stored information 134 can include hardware based characteristic information 202, operating system configuration information 204, Web browser related information 205, applications environment information 206, patch level information 208, security information 210, business profile information 212, customer information 214, operator terminal type information 216 and default operator terminal configuration information 218.

Hardware based characteristic information 202 include hardware type information 220, rate information 222, and protocol information 224. Hardware type information 220 identifies various customer user device type information and operator terminal device type information that can be used corresponding to business affiliation 1. Rate information 222 can include information identifying the potential communications data rates supported corresponding to a connection between a customer and an operator terminal corresponding to business affiliation 1. Protocol information 224 can include information corresponding to the various supported communications protocols used corresponding to business affiliation 1. Operating system signature information 204 can include type information 226, e.g., information identifying one or more operating systems, and corresponding version information 228. Web browser related information 205 can include type information 207, e.g., information identifying one or more supported Web browsers corresponding to business affiliation 1, and corresponding version information 209. Application environment information 206 can include a set of application programs 230, e.g., custom programs and/or commercially available software programs, utilized by business affiliation 1.

Patch level information 208 can include patch information corresponding to operating system software, Web browser software, and/or applications software. Patch level information 208 also can include predetermined patch level criteria used to determine whether or not additional security operations are to be provided to compensate for a low software patch level being used by a customer. Security information 210 can include encryption/decryption information and security modules including security patch modules.

Business profile information 212 include type of service information 232, e.g., phone and/or Web based service, field of service information 234, e.g., sales, technical support, billing, insurance, medical, etc., time range of service information 236, connection throughput information 238, and cost profile information 240. Time range of service information 238 include information identifying times in which the communications center can be contracted to support business affiliation 1 connections, e.g., 24 hrs 7 days a week, Monday-Friday 9 AM-5 PM time zone 1, etc. Connection throughput information 238 can include information identifying the maximum number of simultaneous connections for which business affiliation 1 has contracted the communications center to support. Cost profile information 240 can include information identifying the charging method or method applicable to business affiliation 1 customer connections, e.g., no charge to customer, charge based on a connection, a predetermined number of minutes of service for free, charge by unit of times, charge based on a purchased plan, etc.

Customer information 214 can include customer identification and/or access information 242, and a plurality of sets of customer information (customer 1 information 244, . . . , customer N information 245). Customer identification and/or access information 242 can include entry level customer access and/or identification information, e.g., corresponding to facilitating anonymous customer connections, identifiable customer connections, connections for customers within groups, and connections for specific customers. The specific customer and/or the customer within a group has, e.g., a access code, number or password, used to restrict access.

Customer 1 information 244 can include access information 246, customer device capability information 248, current operator terminal configuration information 250 and previous session information 254. Access information 246 can be, e.g., a unique password or identifier associated with customer 1. Customer device capability information 248 can include, e.g., a list of hardware device characteristics, operating system information, Web browser information, and application information identifying capabilities of customer 1's communications device. The information in customer device capability information 248 can include, e.g., information identifying elements, e.g., subsets from within hardware based characteristic information 202, operating system signature information 204, Web based browser information 205, and/or applications environment information 206.

Current operator terminal configuration information 250 can include, e.g., information 300 of FIG. 3 which can be generated and loaded into an operator terminal which is currently being used to service customer 1. Previous session information 254 can include operator identification information 256, operator terminal configuration information 258, session identification information 260, session user data information 262 and action item information 264. Operator identification information 256 can be, e.g., an operator number presented to customer 1 corresponding to a business affiliation 1 communication session, and can be and sometimes is used to facilitate compatible operator terminal configuration when initiating another communications session. This operator identification number can represent a virtual operator. This operator identification number can be used to coordinate operator terminal configuration to make it appear to the customer that he/she is interacting with the same operator from one communications session to the next, even though the actual operator may be different. Operation terminal configuration information 258 can include a set of state information characterizing operator terminal configuration at the end of the communications session which is the previous communications session. Session identification information 260 can include identification information corresponding to the previous session, e.g., a session identifier number, customer identification information, and operator identification information, e.g., an alias name used by the operator. Session user data/information 262 can include, e.g., user information, such as a bill, a purchase order, a shopping cart list, text, images, etc., which were present at the end of the previous communications session. Such information 262 can be useful for rapidly entering a follow-on communications session. Action item information 264 can include information corresponding to issues unresolved at the end of the previous communications session, e.g., information identifying a item requiring checking or additional data by the customer and or the terminal operator, e.g., information identifying that device S/N is required and to be obtained corresponding to a warranty repair, information identifying that the operator is to contact a health care provider for clarification of a medical procedure, etc.

Operator terminal type information 216 can include information identifying types of operator terminals within the communications center which are compatible with the requirements of business affiliation 1 support activities. In some embodiments, operator terminal type information 216 identifies a subset of specific operator terminals at the communications center which may be used for a connection associated with business affiliation 1, e.g., via hardware addresses. Default operator terminal configuration information 218 can include, e.g., a set of operator terminal configuration information used to configure an operator terminal when the connection initiation request corresponds to a new customer and/or a customer seeking access an anonymous customer or guest customer corresponding to business affiliation 1.

FIG. 3 is a drawing of exemplary current operator terminal configuration information 300. Operator terminal configuration information 300 can include hardware based characteristic setting information 302, operating system information 304, application software information 306, and operator terminal environment information 308. Hardware based characteristic setting information can include, e.g., settings for: device data rate, signal format, device identifier, address, etc. Operating system information 304 can include type information 310, version information 312, patch level information 314 and applied patch information 316. Applications software information 306 can include set of resident program information 318, version information 320, patch level information 322, applied patch information 324, application precedence information 326, and applications interaction information 328. Operator terminal environment information 308 can include operator terminal cookies/state variable information 330, application preference information 332, operator terminal login information 334, and operator terminal login affiliation, e.g., working group, information 336. Affiliation information 336 allows the operator terminal to coordinate operations with other operator terminals corresponding to the same business affiliation, e.g., identify, coordinate, and/or transfer the customer to another operator terminal, e.g., a supervisor's operator terminal.

Figure 4A:
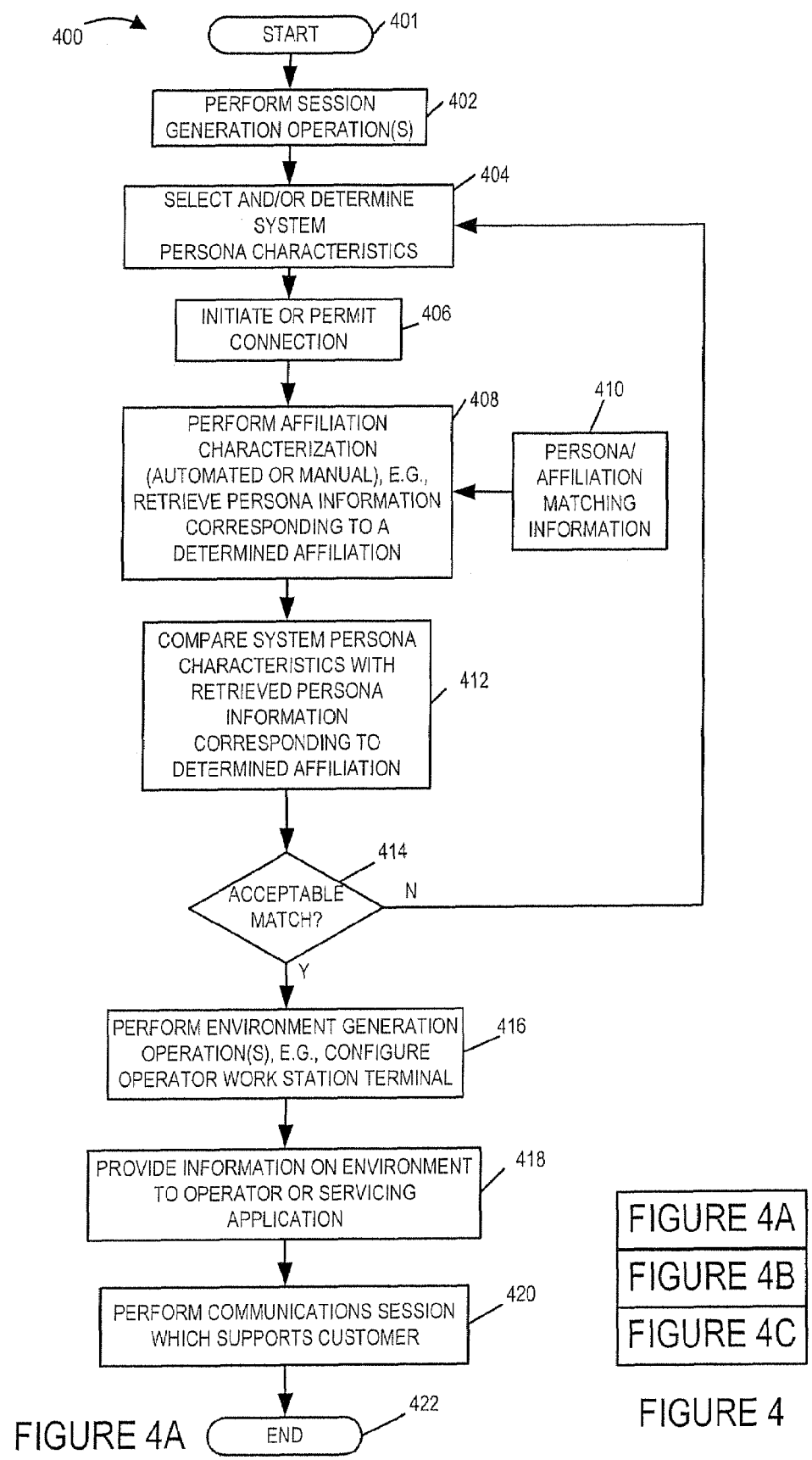
FIG. 4 comprising the combination of FIG. 4A, FIG. 4B and FIG. 4C, is a flowchart of an exemplary method of operating a communications center.
Figure 4B:
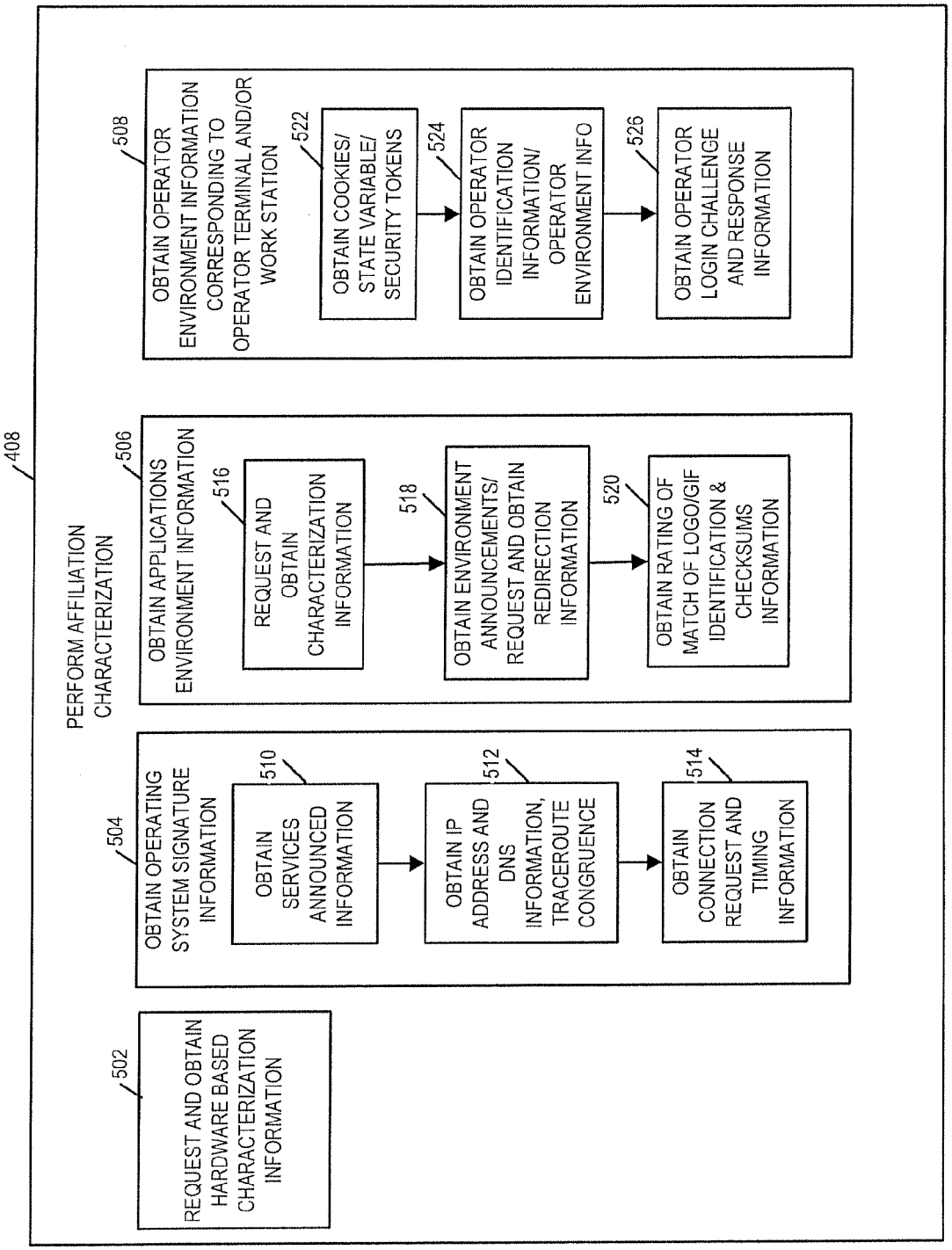
Figure 4C:
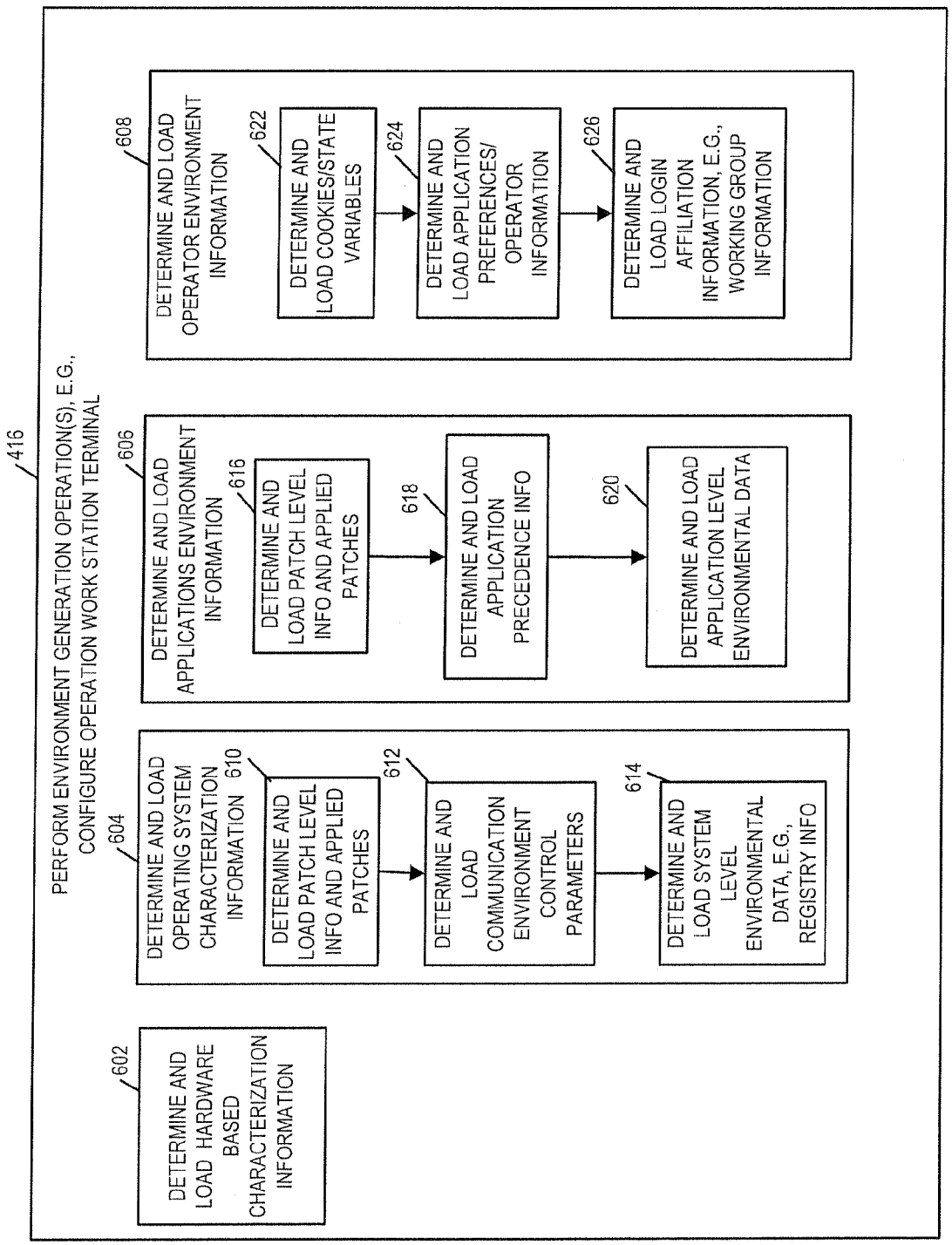

FIG. 4 comprising the combination of FIG. 4A, FIG. 4B and FIG. 4C, is a flowchart 400 of an exemplary method of operating a communications center in accordance with various embodiments. The communications center supports phone and/or Web based communications interactions with customers. The communications center can include a plurality of operator terminals and at least some of the operator terminals can be and sometimes are, configured differently at different times, e.g., to support a different affiliation characterization. In various embodiments, from the perspective of a customer accessing the communications center, at times, two communications sessions at different times appear to be with the same communications center operator and operator terminal; however, a different operator terminal and a different operator are actually interacting with the customer. In various embodiments, operator terminal configuration state information can be stored, maintained, loaded and/or transferred to duplicate operator terminal set-up from one session to another. In some embodiments, operator identification information, e.g., an alias name, can be carried over and used by different operators from one session to a follow up session thus maintaining the appearances of interaction with the same operator from the perspective of the customer. In some embodiments, the communications center can include a persona management module which performs some or all of the steps of flowchart 400. Operation starts in step 401, where the communications center can be powered on and initialized and proceeds to step 402. This information can also be used to determine customer characteristics so that the operator pool may be better trained and aligned to meet customer needs.

In step 402, the communications center performs session generation operation(s). Session initiation signaling can be performed in step 402, in some embodiments. The session initialing may be a push or pull operation. For example, external signaling from a customer can be the session initiation signaling, or the communications center can be performing a call back operation to initiate a session with a customer. The communications session can be, e.g., voice, XML, or using some other session protocol. Operation proceeds from step 402 to step 404.

In step 404, the communications center selects and/or determines system persona characteristics. For example, one selection and/or determination of step 404 is the selection of an operating system type or software environment, e.g., ACTIVEX vs JAVA. Operation proceeds from step 404 to step 406. In step 406, the communications center initiates or permits a connection.

Then, in step 408, the communications center performs an affiliation characterization, e.g., retrieving persona information corresponding to a determined affiliation 410. The communications center may, and sometimes does, provide services for a plurality of different companies. Persona/affiliation matching information 410 is, e.g., the one of a plurality of different sets of stored information corresponding to the particular affiliation of the customer to be serviced at present for which a communications session can be being established. The affiliation characterization operation, in some embodiments, can be fully automated. In other embodiments, the affiliation operation can be manual, while in still other embodiments, portions of the characterization are performed manually while other portions are performed automatically.

FIG. 4B provides a more detailed description of exemplary operations performed in step 408. Step 408 can include sub-steps 502, 504, 506 and 508. In sub-step 502, the communications center requests and obtains hardware based characterization information. In sub-step 504, the communications center obtains operating system signature information. Sub-step 504 can include sub-steps 510, 512 and 514. In sub-step 510, the communications center obtains services announced information 510. In sub-step 512, the communications center obtains MAC address, IP address information, DNS information, and traceroute congruence information. In sub-step 514, the communications center obtains connection request and timing information 514. In sub-step 506, the communications center obtains applications environment information. Sub-step 506 can include sub-steps 516, 518 and 520. In sub-step 516, the communications center requests and obtains characterization information. Then, in sub-step 518, the communications center obtains environment announcements/requests and obtains redirection information, and in sub-step 520 the communications center obtains rating of match of LOGO/GIF identification and checksums information. In sub-step 508, the communications center obtains operator environment information corresponding to operator terminal and/or work station. Sub-step 508 can include sub-steps 522, 524 and 526. In sub-step 522 the communications device obtains cookies/state variable security tokens. Then in sub-step 524, the communications center obtains operator identification information/operation environment information, and in sub-step 526, the communications center obtains operator login challenge and response information.

Operation proceeds from step 408 to step 412, in which the communications center compares system persona characteristics with retrieved persona information corresponding to the determined affiliation. In step 414 if the comparison indicates an acceptable match, then operation proceeds to step 416; otherwise operation proceeds to step 404 for additional consideration of the selection and/or determination of persona system characteristics.

Returning to step 416, in step 416, the communications center performs environment generation operation(s), e.g., configuring an operator work station terminal. Step 416 is described in more detail in FIG. 4C. Step 416 can include sub-steps 602, 604, 606 and 608. In sub-step 602, the communications center determines and loads hardware based characterization information. In sub-step 604, the communications center determines and loads operating system characterization information. In sub-step 606, the communications center determines and loads applications environment information. In sub-step 608, the communications center determines and loads operator environment information. Sub-step 604 can include sub-steps 610, 612 and 614. In sub-step 610, the communications center determines and loads patch level information and applied patches, and in step 612 the communications center determines and loads communication environment control parameters, and in sub-step 614, the communications center determines and loads system level environmental data, e.g., registry information. Sub-step 606 can include sub-steps 616, 618 and 620. In sub-step 616, the communications center determines and loads patch level information and applied patches, while in sub-step 618, the communications center determines and loads application precedence information. In sub-step 620, the communications center determines and loads application level environmental data. Sub-step 608 can include sub-steps 622, 624 and 626. In sub-step 622, the communications center determines and loads cookies/state variables. In sub-step 624, the communication center determines and loads application preferences/operator information. In sub-step 626, the communications center determines and loads login affiliation information, e.g., working group information.

Operation proceeds from step 416 to step 418. In step 418, the communications center provides information on environment to the operator or servicing application. Operation proceeds from step 418 to step 420. In step 420 the communications center performs communications session operations which support the customer. Following termination of the communication session, operation proceeds to stop step 422.

FIG. 5 is a drawing of an exemplary communication system 700 implemented in accordance with various embodiments. Exemplary communications system 700 can include a plurality of customer communications devices (702, 704, 706, 708, 710, 712), a communications center 714, e.g., a customer service and/or sales communications center. Exemplary communications center 714 supports interaction with customers via the PSTN network, the Internet, and a private communications network. Communications center 714 can include a PSTN interface 716, an Internet interface 718, a private network interface 720, a plurality of configurable operator terminals (configurable operator terminal 1 724, configurable operator terminal 2 726, . . . , configurable operator terminal n 728), a management device 722, and an affiliation characterization database 132, coupled together via bus 730 over which the various elements may exchange data and information.

Telephones (702, 704) are coupled to PSTN interface 716 via communications links (744, 746) respectively. Personal computer devices (PC 1 706, PC n 708) are coupled to Internet interface 718 via communications links (748, 750), respectively. Personal computer devices (PC 1A 710, PC N 712) are coupled to private network interface 720 via communications inlinks (752, 754), respectively.

Management device 722 manages the configuration of the operator terminals (724, 726, . . . 728). Management device 722 also decides whether or not a connection is to be completed between a customer and an operator terminal. Statistics may be gathered on this decision. When management device 722 decides that a connection is to be completed the management device 722 selects the operator terminal to be used for serving the customer. Management device 722 generates a set of configuration information for the selected operator terminal and installs that information in the selected operator terminal. At different times, the same operator terminal can be configured to support different business affiliations. At different times, different operator terminals are configures such that from a customer's perspective, the customer thinks that he/she is interacting with the same operator terminal and same operator even though both operator terminal and operator have actually changed from one communications session to a follow on communication session.

Management device 722 can include an I/O interface 732, a processor, e.g., CPU 734, and a memory 736 coupled together via bus 742 over which the various elements may interchange data and information. Memory 736 can include routines 738 and data/information 740. The processor, e.g., CPU 734, executes the routines 738 and uses the data/information 740 in memory 736 to control the operation of the management device 722 and implement methods. Routines 738 include a persona management module 742. The persona management module 742, in some embodiments implements the method of flowchart 100 or flowchart 400.

Affiliation characterization database 132 can include a plurality of sets of business affiliation information (business affiliation 1 stored information 134, . . . , business affiliation n stored information 136). The management device 722 retrieves and utilizes information in database 132. In various embodiments, management device 722 also updates information in database 132. In some embodiments, the affiliation characterization database 132 can be included as part of the management device 722.

Figure 6:
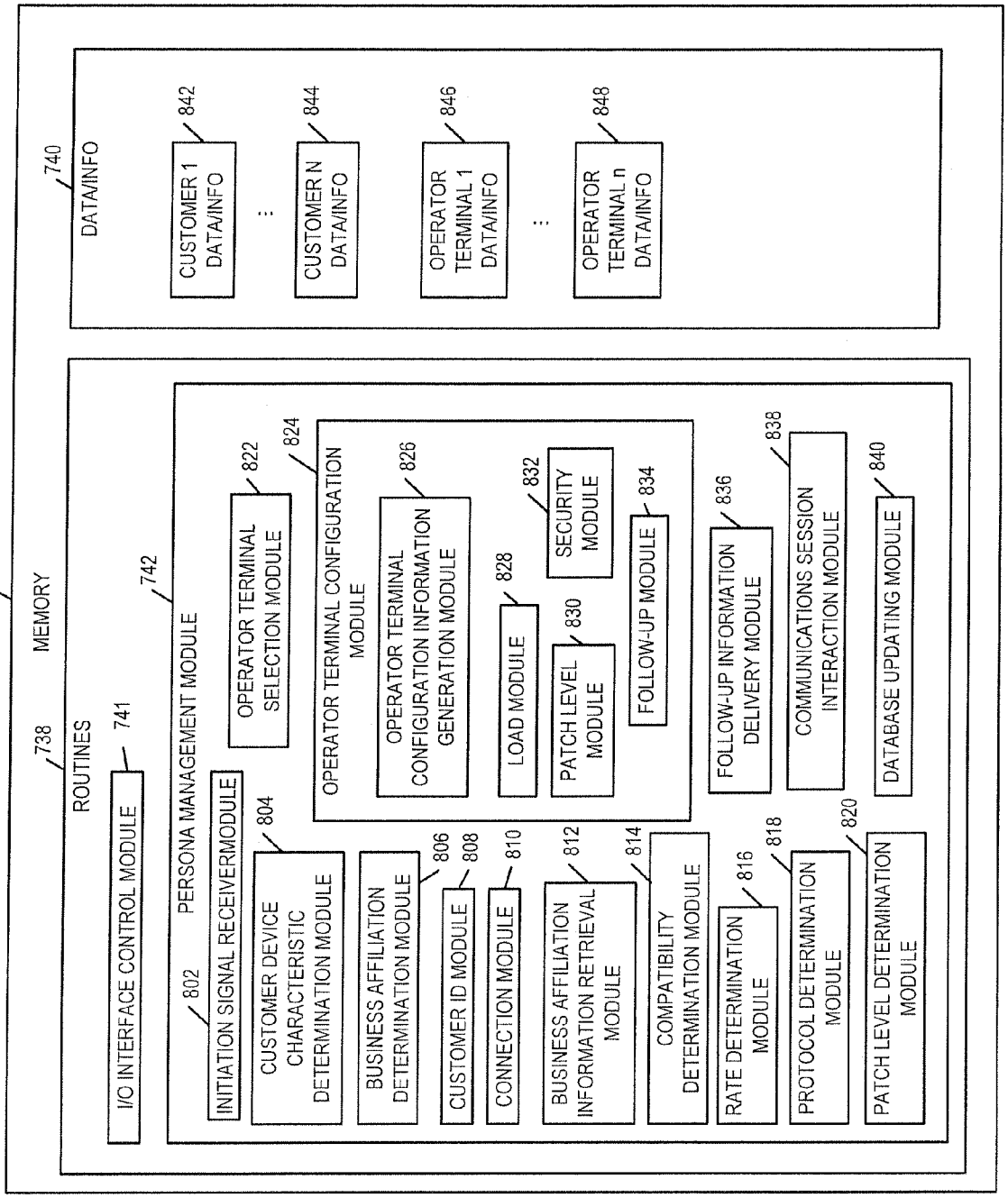
FIG. 6 is a drawing of an exemplary memory, which may be the memory in a management device in the communications center of FIG. 5.

FIG. 6 is a drawing of an exemplary memory 736 in accordance with various embodiments. Memory 736 can be, e.g., a more detailed representation of memory included in management device 722 in FIG. 5. Memory 736 can include routines 738 and data/information 740. Routines 738 include an I/O control routine for controlling operation of I/O interface 732 and a persona management module 742. Operations of the person management module 742 include managing the configuration at each of a plurality of different operator terminals being used to service customers. The persona management module 742 can include an initiation signal receiver module 802, a customer device characteristic determination module 804, a business affiliation determination module 806, a customer identification module 808, a connection module 810, a business affiliation information retrieval module 812, a compatibility determination module 814, a rate determination module 816, a protocol determination module 818, a patch level determination module 820, an operator terminal selection module 822, an operator terminal configuration module 824, a follow-up information delivery module 836, a communications session interaction module 838, and a database updating module 840. Operator terminal configuration module 824 can include an operator terminal information generation module 826, a load module 828, a patch level module 830, a security module 832 and a follow-up module 834.

Initiation signal receiver module 802 receives a signal corresponding to initiation of communications between a customer and a company representative, e.g., a telephone call signal, a Web based communications signal, an XML business to business query signal. Customer device characteristic determination module 804 determines from the received signal at least some customer device characteristic information, e.g., a type of communications device being used by the customer, an operating system being used by the customer, a Web browser being used by the customer, a version of the operating system or Web browser being used by the customer, application information corresponding to the customer device, protocol information corresponding to the customer device, and/or rate information corresponding to the customer device.

Business affiliation determination module 806 determines a business affiliation corresponding to the customer. Customer identification module 808 determines customer identification information. Connection module 810 decides whether or not to allow a connection between the customer and an operator at the present time. Business affiliation information retrieval module 812 retrieves a set of information corresponding to the determined business affiliation from a plurality of stored sets of business affiliation information, said retrieved information including at least some system configuration information. Compatibility determination module 814 determines whether or not the determined customer device characteristics are compatible with the retrieved set of information corresponding to the determined business affiliation. Rate determination module 816 determines a communications rate used by a customer device. Protocol determination module 818 determines a communications protocol used by a customer device. Patch level determination module 820 determines a level of software patch installed on the customer's device.

Operator terminal selection module 822 selects an operator terminal which can support communications with the customer from among the set of available operator terminals meeting the hardware/software capability requirements needed to satisfy the customer. Operator terminal configuration module 824 configures a selected communications device in accordance with at least some retrieved system configuration information. Operator terminal configuration module 824 can include an operator terminal configuration information generation module 826, a load module 828, a patch level module 830, a security module 832, and a follow-up module 834. Operator terminal configuration information generation module 826 generates a set of configuration information to be loaded in a selected operator terminal to support communications with a customer. Load module 828 controls transfer of the generated operator terminal configuration information into the selected operator terminal. Patch level module 830 determines if the patch level in the customer device is below a predetermined level. Security module 832, acts in response to a determined low level of patch in a customer device to configure the operator terminal to perform additional security operations, e.g., to compensate for the low patch level. Follow-up module 834 can include a sub-module which determines if a received signal represents a follow-up to a previous communication with a customer, and a configuration customization sub-module which performs operation to configure an operator terminal to interact with the customer in a manner that appears to the customer as an interaction with the same operator terminal used in the previous communication which is being followed-up. Thus configuration customization sub-module operation retrieves session and operator terminal state information corresponding to an old communications session with a customer and forwards the information to an operator terminal being used for a follow-up communications session with the customer.

Follow-up information delivery module 836 provides information to an operator using a configured operator terminal to enable the current operator to appear to the customer as a previous operator involved in the previous communication. For example, one example of information provided can be an alias name which was used by the operator in the previous session when interacting with the customer, the same alias name to be used by the current operator of the follow-up communications session.

Communications session interaction module 838 control operation of the operator terminal to interact with a customer device in a communication session. Database updating module 840 updates a set of information corresponding to a determined business affiliation to reflect latest customer information. Operations of database updating module 840 include, e.g., storing a set of operator terminal state information at the end of a communications session which is expected to be followed up with another communications session, storing a set of communication session state information at the end of a communications session which is expected to be followed up with another communications session, storing action item information, and updating customer information to reflect new hardware and/or software capabilities.

Data/information 740 can include a plurality of sets of information corresponding to customers (customer 1 data/information 842, . . . , customer N data/information 844) and a plurality of sets of operator terminal data/information (operator terminal 1 data/information 846, . . . , operator terminal n data/information 848). Exemplary customer 1 data/information 842 can include a received initiation signal, determined customer device characteristic information such as, e.g., device type info, Web browser identification information, operating system identification information, version identification information, a determined business affiliation, a determined communications rate, information identifying a determined protocol, information identifying a determined level of software patch, customer identification information, previous session identification information, information identifying a selected operator terminal to communicate with the customer, and a set of operator terminal configuration information tailored to the customer.

Operator terminal 1 data/information 846 can include, e.g., information identifying which business affiliations can be supported by the capabilities of operator terminal 1, information identifying whether operator terminal 1 is currently available for assignment or occupied with a customer, information identifying the business affiliation, if any, currently associated with operator terminal 1, a set of generated operator terminal configuration information to be installed or currently installed in operator terminal 1, information identifying a customer being serviced or to be serviced, information identifying other operator terminals currently operating in a working group for the same business affiliation, information identifying the actual operator at operator terminal 1, and information identifying an alias operator name to be assumed by the operator at operator terminal 1 for interactions with a specific customer.

Figure 7:
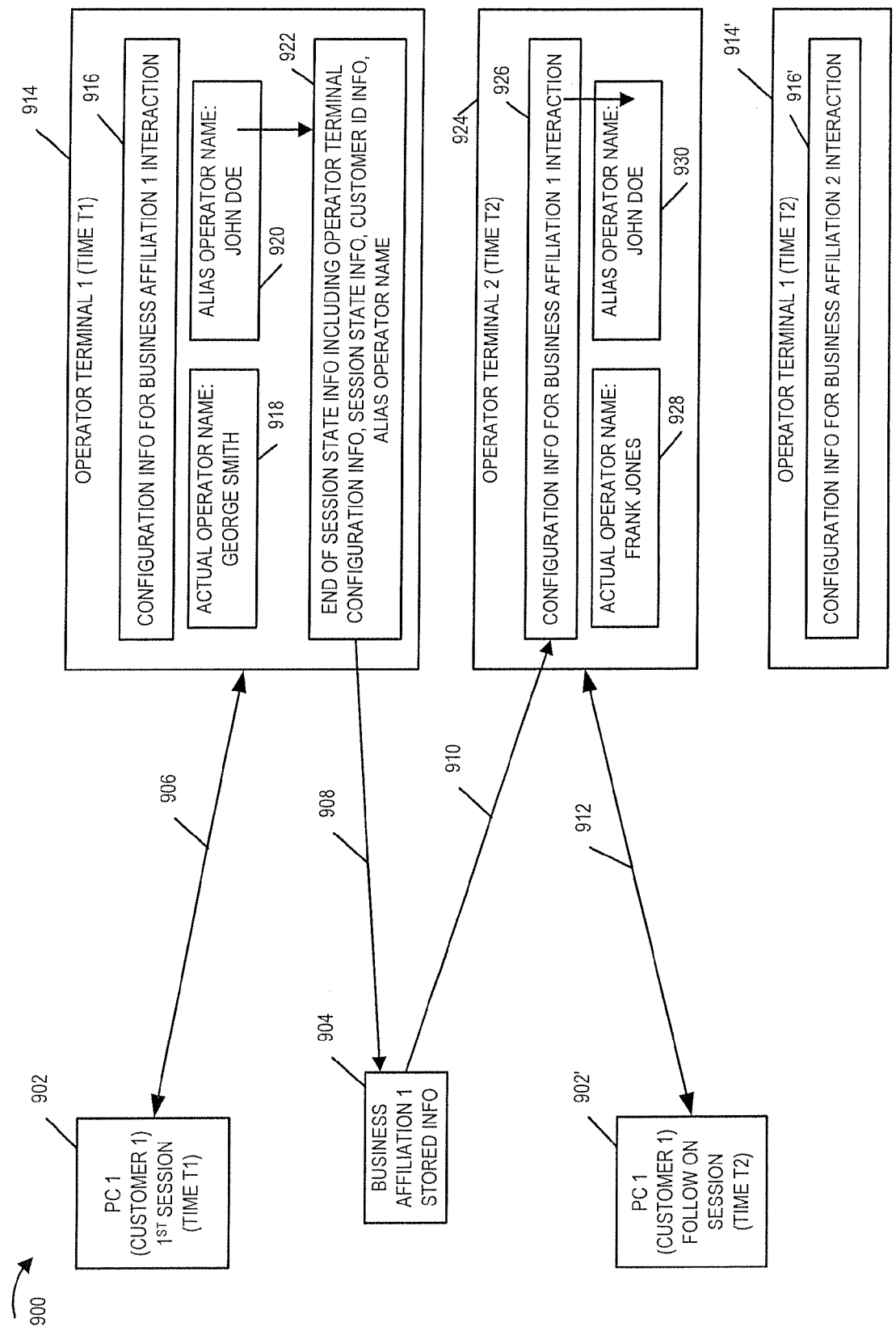
FIG. 7 is a drawing illustrating a customer's interactions with different reconfigurable operator terminals in which state information can be retained and transferred.

FIG. 7 is a drawing 900 illustrating features included in various exemplary embodiments. Drawing 900 illustrates an exemplary customer communications device, personal computer 1 interacting with different operator terminals at different times. However, from the perspective of the customer, the customer thinks that he/she is interacting with the same operator terminal and same operator. Box 902 represents PC 1 at time T1, while box 902' represents PC 1 at time T2. Box 914 represents operator terminal 1 at time T1, while box 914' represents operator terminal 1 at time T2. Box 924 represents operator terminal 2 at time T2. PC 1 can be, e.g., PC 1 706 of FIG. 5, while operator terminal 1 can be configurable operator terminal 1724 of FIG. 5 and operator terminal 2 can be configurable operator terminal 2 726 of FIG. 5.

PC 1 seeks to establish a communications session with an operator supporting business affiliation 1. The communications center management device 722 selects operator terminal 1 to be used, generates a set of configuration information and loads the information in operator terminal 1. Configuration information for business affiliation 1 interaction 916 represents such a set of information. At operator terminal 1, the actual operator is George Smith 918; however, an alias name John Doe 920 is used. At the end of the communications session, state information 922 including current operator terminal (The terminal may be a set of computers or computer driven systems) configuration information, current session state information, customer identification information and the alias operator name can be copied to business affiliation 1 stored information 904, e.g., in database 132.

At some time later, customer 1 seeks to initiate a follow-up communications session. The communications center management device 722 at this time selects operator terminal 2 to be used, since operator terminal 1, can be now be used to support business affiliation 2 interactions as indicated by configuration information for business affiliation 2 interaction 916' in box 914'. The communications center management device 722 generates a set of configuration information for business affiliation 1 interaction 926 which can be loaded into operator terminal 2. This generated set of information 926 can include at least some of the end of session state information 922, which was retrieved from business affiliation 1 stored information 904. Operator terminal 2 obtains the alias name John Doe 930 from information 926, allowing the actual operator Frank Jones 928 to appear to the customer as being the same operator in the first communications session. Additional information from the $1^{st}$ communication session can also be available to the operator at terminal 2 to allow the follow on session to quickly pick-up where previously left off.

Line 906 indicates that a first communications session occurs between PC 1 and operator terminal 1; while line 912 indicates that a follow-on communication session occurs between PC 1 and operator terminal 2. Line 908 indicates that end of session state information can be stored; while line 910 indicates that at least some of the stored end of session state information can be retrieved and used by operator terminal 2 for the follow on communications session.

In some embodiments, various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., a general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s).

Numerous additional variations on the methods and apparatus of the embodiments described above will be apparent to those skilled in the art in view of the above descriptions. Such variations are contemplated herein. In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method of implementing a communications center, the method comprising:
   receiving a signal over a public network corresponding to initiation of communications between a customer and a company representative;
   determining from the received signal at least some customer device characteristics;
   determining a business affiliation corresponding to said customer;
   accessing a set of information corresponding to said determined business affiliation from a plurality of stored sets of business affiliation information, said stored sets including at least some system configuration information;
   configuring at least one communications device associated with the company representative in accordance with at least some accessed system configuration information; and
   providing information to a current operator using the configured at least one communications device to enable the current operator to appear to the customer as a previous operator involved in a previous communication with the customer, said information including at least one of: i) an alias name assumed by the previous operator that can be assumed by the current operator or ii) an alias customer support representative number assumed by the previous operator that can be assumed by the current operator, said current operator being said company representative.

2. The method of claim 1, wherein said at least one communications device is an operator terminal.

3. The method of claim 2 wherein the company representative is one of a telephone operator and a customer service representative.

4. The method of claim 1, wherein said determining from the received signal at least some customer device characteristics includes determining a type of communications device being used by the customer.

5. The method of claim 4, further comprising:
   determining at least one of a communications rate and a communications protocol supported by the communications device being used by the customer.

6. The method of claim 1, wherein determining from the received signal at least some customer device characteristics includes determining at least one of an operating system and a web browser being used by said customer.

7. The method of claim 6, wherein said determining from the received signal at least some customer device characteristics further includes determining the version of at least one of the operating system and the web browser used by said customer.

8. The method of claim 2, wherein the set of accessed information corresponding to the business affiliation further includes at least one of: information on the nature of the communications interaction, connection type preference, call status, previously negotiated interaction rules.

9. The method of claim 8, wherein said receiving a signal corresponding to initiation of communications between a customer and a company representative includes receiving a telephone call.

10. The method of claim 8, wherein said receiving a signal corresponding to initiation of communications between a customer and a company representative includes receiving a Web based communications signal.

11. The method of claim 8, wherein said receiving a signal corresponding to initiation of communications between a customer and a company representative includes receiving an extended markup language (XML) business to business query signal.

12. The method of claim 1, further comprising:
   determining a level of a software patch installed on the customer's device; and
   wherein configuring at least one communications device includes configuring the device to operate in a manner compatible with the determined level of said software patch.

13. The method of claim 12, wherein the communications device is configured to perform an additional security operation when the determined software patch is of a level lower than a predetermined software patch level.

14. The method of claim 1, wherein configuring the at least one communications device includes:
   configuring an operator terminal to interact with a customer in a manner that appears to the customer as an interaction with the same operator terminal used in the previous communication includes setting software to the same operating state as when the previous communication ended.

15. The method of claim 1, further comprising:
   providing information to the current operator that was exchanged between the previous operator and the customer during a previous communication to enable the current operator to appear to the customer as the previous operator involved in the previous communications.

16. The method of claim 15, wherein said provided information includes information about a customer representative identifier used in the previous communication; and
   information exchanged between the customer representative and the customer during the previous communication.

17. A communications system, the system comprising:
a receiver module for receiving a signal over a public network corresponding to initiation of communications between a customer and a company representative;
a customer device characteristic determination module for determining from the received signal at least some customer device characteristics;
a business affiliation determination module for determining a business affiliation corresponding to said customer;
an information retrieval module for retrieving a set of information corresponding to said determined business affiliation from a plurality of stored sets of business affiliation information, said information including at least some system configuration information; and
a configuration module for configuring at least one communications device associated with the company representative in accordance with at least some retrieved system configuration information; and
a follow-up information delivery module that provides information to a current operator for configuring the at least one communications device to enable a current operator using the at least one communications device to appear to the customer as a previous operator involved in a previous communication, said information including at least one of: i) an alias name assumed by the previous operator that can be assumed by the current operator or ii) an alias customer support representative number assumed by the previous operator that can be assumed by the current operator, said current operator being said company representative.

18. The apparatus of claim 17, wherein said communications device which is configured is an operator terminal.

19. The system of claim 18, wherein the company representative is one of a telephone operator and a customer service representative.

20. The system of claim 17, wherein said customer device characteristic determination module determines a type of communications device being used by the customer.

21. The system of claim 20, further comprising:
at least one of a communications rate determination module for determining a communications rate supported by the customer device and a communications protocol determination module for determining a communications protocol supported by the communications device being used by the customer.

22. The system of claim 17, wherein the customer device characteristic determination module determines at least one of an operating system and a web browser being used by said customer.

23. The system of claim 18, further comprising:
a database including said set of access information, the set of accessed information corresponding to the business affiliation further including at least one of: information on the nature of the communications interaction, connection type preference, call status, previously negotiated interaction rules.

* * * * *